US011435012B2

United States Patent
Lechner

(10) Patent No.: US 11,435,012 B2
(45) Date of Patent: Sep. 6, 2022

(54) ELBOW SCREW JOINT SYSTEM

(71) Applicant: PFLITSCH GMBH & CO. KG, Hueckeswagen (DE)

(72) Inventor: Martin Lechner, Lindlar (DE)

(73) Assignee: PFLITSCH GMBH & CO. KG, Hueckeswagen (DE)

(*) Notice: Subject to any disclaimer, the term of this patent is extended or adjusted under 35 U.S.C. 154(b) by 146 days.

(21) Appl. No.: 16/935,971

(22) Filed: Jul. 22, 2020

(65) Prior Publication Data

US 2020/0347964 A1 Nov. 5, 2020

Related U.S. Application Data

(63) Continuation of application No. PCT/EP2019/051335, filed on Jan. 21, 2019.

(30) Foreign Application Priority Data

Jan. 22, 2018 (DE) .................... 10 2018 101 350.7

(51) Int. Cl.
*F16L 5/02* (2006.01)
*F16L 41/00* (2006.01)
*F16L 43/02* (2006.01)

(52) U.S. Cl.
CPC ............... *F16L 5/02* (2013.01); *F16L 41/005* (2013.01); *F16L 43/02* (2013.01); *Y10T 29/49826* (2015.01)

(58) Field of Classification Search
CPC . F16L 5/02; F16L 41/005; F16L 43/02; F16L 41/08; F16L 43/00; F16L 43/008;

(Continued)

(56) References Cited

U.S. PATENT DOCUMENTS 960,744 A 6/1910 Vogel
2,955,851 A 10/1960 Scott
(Continued)

FOREIGN PATENT DOCUMENTS

CN 202068138 12/2011
DE 202015101698 7/2016
(Continued)

OTHER PUBLICATIONS

International Search Report for International Application PCT/EP2019/051335, dated Apr. 18, 2019.

*Primary Examiner* — Zachary T Dragicevich
*Assistant Examiner* — William S. Choi
(74) *Attorney, Agent, or Firm* — Burris Law, PLLC

(57) ABSTRACT

An elbow screw joint system for screw-connecting and rerouting elongate shaped parts includes a guiding body, an insert and a cover. The insert has a guiding section rotatably arranged at least partially inside the guiding body. The guiding body has a guiding recess and an outlet recess. The guiding recess has a guiding axis and extends along the guiding axis from a receiving side to an opposite head side. The outlet recess has an outlet axis and extends from an outlet side, along the outlet axis, to the guiding recess. Also, the guiding axis and the outlet axis are at an angle relative to one another. The guiding section has a screw thread at an upper end region which is associated with the head side of the guiding body, and the cover is screw-connected, from the head side, to the screw thread of the guiding section.

16 Claims, 3 Drawing Sheets

Figure 1:
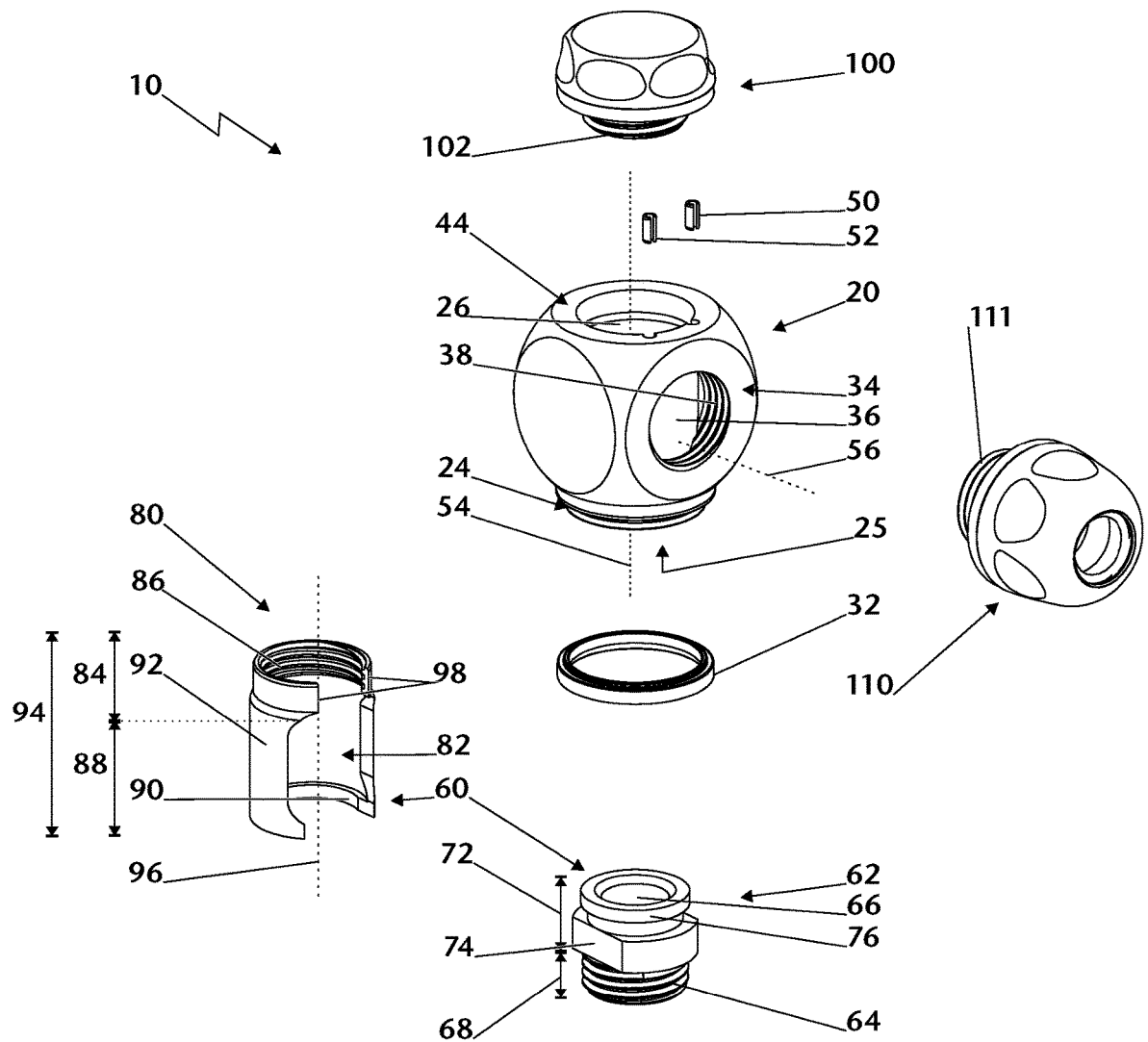

(58) Field of Classification Search
CPC ... F16L 47/26; F16L 47/28; F16L 3/04; F16L 27/093; F16L 41/021; F16L 41/02; F16L 47/32; F16L 5/06; F16L 19/062; H02G 15/08; H02G 3/06
USPC .................................................. 285/179, 182
See application file for complete search history.

(56) References Cited

U.S. PATENT DOCUMENTS

| | | | | |
|---|---|---|---|---|
| 3,125,360 | A * | 3/1964 | Ulrich ................... | F16L 27/093 |
| 3,147,015 | A * | 9/1964 | Hanback ............... | F16L 27/093 |
| 3,219,366 | A * | 11/1965 | Franck ................. | F16L 41/005 |
| 3,967,838 | A * | 7/1976 | Legris .................... | F16L 41/08 |
| 6,109,659 | A * | 8/2000 | Heidenreich ......... | F16L 27/087 |
| 8,968,023 | B1 | 3/2015 | Walters et al. | |

FOREIGN PATENT DOCUMENTS

| | | |
|---|---|---|
| EP | 1935358 | 6/2008 |
| JP | 2011072172 | 4/2011 |

* cited by examiner

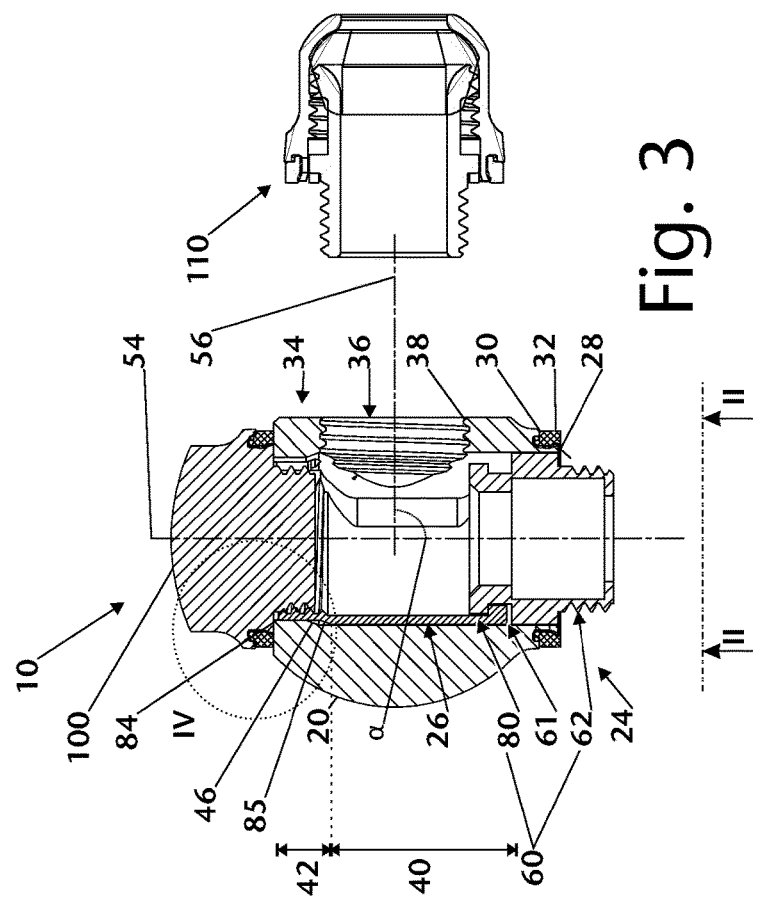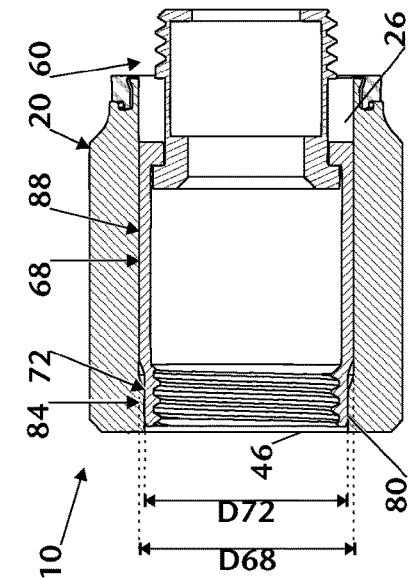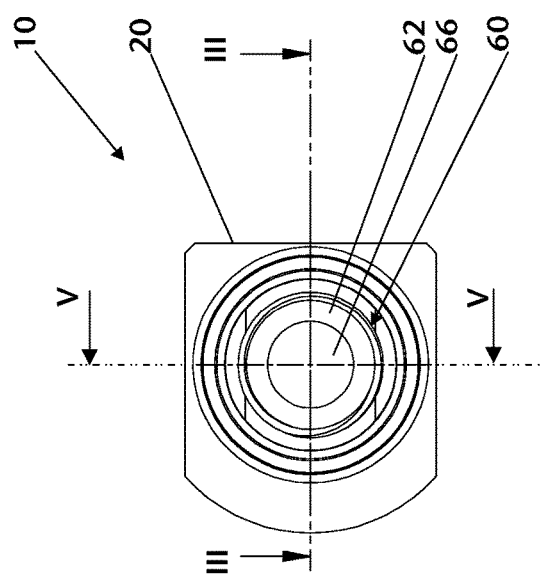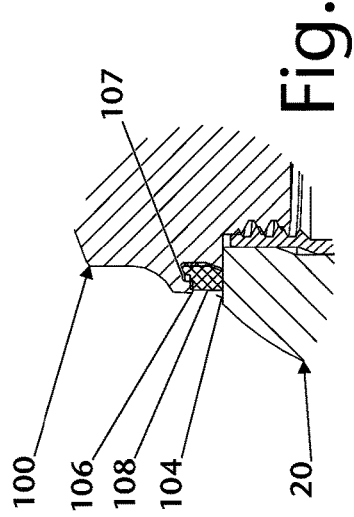

ELBOW SCREW JOINT SYSTEM

CROSS-REFERENCE TO RELATED APPLICATIONS

This application is a continuation of International Application No. PCT/EP2019/051335, filed on Jan. 21, 2019, which claims priority to and the benefit of DE 10 2018 101 350.7, filed on Jan. 22, 2018. The disclosures of the above applications are incorporated herein by reference.

FIELD

The present disclosure relates to an elbow screw joint system for screwing and redirecting of long line components, such as, for example, cables, pipes or hoses.

BACKGROUND

The statements in this section merely provide background information related to the present disclosure and may not constitute prior art.

Elbow screw joint systems are generally known from the prior art. DE 20 2015 101 698 U1, for example, describes an apparatus for guiding of flexible long line components through a wall of a housing, where the wall is equipped with a feedthrough perforation, consisting of at least one double nipple with external threading formed on both end regions, wherein an angled piece is provided in the shape of a hollow body, whose cavity includes a first outlet which is insertable through the feedthrough perforation, and at least one second outlet whose center longitudinal axis encloses a non-0° angle with the center longitudinal axis of the first outlet.

With the systems known from the prior art, an alignment of a cable outlet is difficult, especially when in the installed state. The known elbow screw joint systems are aligned during the assembly and then the long line component is guided through. A subsequent change to the alignment is no longer possible.

SUMMARY

This section provides a general summary of the disclosure and is not a comprehensive disclosure of its full scope or all of its features.

According to the teachings of the present disclosure, an improved elbow screw joint system is provided. In particular, an elbow screw joint system that allows a simple and fast assembly and/or bolting is provided. Furthermore, an elbow screw joint system that allows a simple subsequent correction of the alignment of an outlet recess is provided.

In one form of the present disclosure, an elbow screw joint system for screwing and redirecting of long line components includes a guide body, an insert and a cover, wherein the insert comprises at least one rotatable guide section disposed at least partly in an interior of the guide body, wherein the guide body includes a guide recess and at least one outlet recess, wherein the guide recess has a guide axis and extends along the guide axis from one holding side up to an opposing head side of the guide body, and wherein the outlet recess has an outlet axis and extends from at least one outlet side of the guide body along the outlet axis at least up to the guide recess, wherein the guide axis and the outlet axis have an angle to each other, wherein the guide section includes a threading on an upper end region associated with the head side of the guide body, and wherein the cover can be screwed from the head side to the threading of the guide section.

In another form of the present disclosure, a method for assembly of an elbow screw joint system is provided. The elbow screw joint system comprises a guide body, an insert and a cover, wherein the insert comprises at least one rotatable guide section which can be disposed at least partly in an interior of the guide body. The method includes inserting at least one long line component through the insert such that the at least one long line component is guided into a guide recess of the guide body and emerges from an outlet recess which is arranged at an angle to the guide recess in the guide body and before or after guiding of the long line component into or through the insert, at least the guide section is inserted into the guide recess of the guide body, wherein with a rotation of the guide body about a longitudinal axis of the guide recess, the guide section is carried along, so that at least one recess of the guide section is aligned to at least one outlet recess of the guide body, and wherein by screwing of the cover over a head side of the guide body to a threading of the guide section, the alignment of the guide body is locked.

In addition, the use of an elbow screw joint system for screwing and alignment of at least one long line component in an angled position is provided.

In still another form of the present disclosure, an elbow screw joint system for screwing and redirecting of long line components, that is, of at least one long line component, comprising a guide body, an insert and a cover is provided. The insert comprises at least one rotatable guide section disposed at least partly in an interior of the guide body. The guide body includes a guide recess and at least one outlet recess. The guide recess has a guide axis and extends along the guide axis from the holding side out to an opposing head side. The outlet recess has an outlet axis and extends from at least one outlet side along the outlet axis, at least up to the guide recess, wherein the guide axis and the outlet axis have an angle to each other. The guide section includes a threading on an upper end region associated with the head side of the guide body, and wherein the cover can be screwed from the head side to the threading of the guide section.

With the elbow screw joint system disclosed in the present disclosure, a simple and fast bolting of long line components is possible, wherein in particular the alignment of the outlet axis is simplified, especially by rotating of the guide body about the guide axis, and thus ultimately also of the long line components into the desired direction, in contrast to the prior art. Furthermore, the elbow screw joint system provides for a subsequent correction of the alignment of the outlet axis, for example, by loosening the bolting of the cover to the guide section and aligning the guide body, for example, with the aid of the at least one long line component.

Long line components comprise at least one elongated, especially flexible, body selected from a group composed of cables, hoses and/or pipes. In some variations, the elbow screw joint system is used for bolting of cables.

In at least one variation, the guide body, the insert and/or the cover comprise a material selected from a group at least comprising a plastic and/or a metal, preferably stainless steel and/or brass.

The guide body comprises the holding side and the opposing, head side. In some variations, the guide body includes at least one outlet side, from which the at least one outlet recess extends in the direction of the guide recess. In one form, approximately 1, approximately 2, approximately 3 or more than approximately 3 outlet recesses extend from one outlet side in the direction of the guide recess. In an additional form, the guide body comprises approximately 1, approximately 2, approximately 3, approximately 4 or more than approximately 4 outlet sides. One or a plurality of outlet recesses can be allocated to each of the outlet sides herein. The interior of the guide body comprises the guide recess and the at least one outlet recess. In one form the guide body is designed essentially as quadrilateral, preferably cube-shaped. In an additional form the guide body is designed as being essentially spherical or egg-shaped. In an additional form the guide body is designed as being essentially cylindrical-shaped. Additional geometric configurations are also possible. The holding side, the head side and/or the at least one outlet side preferably include a smooth surface section. In particular, the smooth surface section is allocated to the guide recess and/or to the outlet recess, respectively.

The term "essentially" within the meaning of the present disclosure denotes a tolerance range which relates to financial and technical considerations for the person skilled in the art, such that the corresponding feature can still be recognized and/or implemented as such.

The guide recess extends in the direction of the guide axis. The guide axis is preferably a straight line. In one configuration the present disclosure provides that the guide recess has a smooth interior surface, and preferably has no thread. In one additional form the interior wall of the guide recess is grooved or is equipped with a thread. In another form the guide recess of the guide body is tapered. Preferably, the tapering of the guide body is allocated to the head side of the guide body. According to an additional form the present disclosure, the guide recess includes at least one first section with a first interior diameter, and more preferably at least one second section with a second interior diameter, wherein the second interior diameter in particular is smaller than that of the first interior diameter. The second section is preferably associated with the head side.

In an additional configuration the present disclosure provides that in the guide recess, the first section passes continuously, in stages and/or in steps into the second section. In particular, the first section is tapered toward the second section. In an additional form the present disclosure provides that the guide recess includes only the first section, extending from the holding side out to the head side, and in some variations features no change in diameter.

In one configuration, the present disclosure provides that at least one positioner is provided at least partly in the guide recess for aligning of the guide section. In particular, the at least one positioner cooperates with at least one positioning geometry of the guide section, as will be explained in greater detail below, for example. In one form the positioner extends at least partially radially from the interior wall of the guide body inward into the guide recess. In a one-part form, the present disclosure provides that the positioner is materially joined to the interior wall, or with the guide body, respectively. In a multi-part form, the positioner is a mated part which is mated into a recess which is associated with the guide recess. Preferably, the at least one positioner comprises at least one clamping pin. In an additional configuration, the positioner comprises at least one groove. More preferably the positioner is associated with the head side, and more preferably in the second section of the guide recess in the region of the tapering, as described above. In an additional form, the positioner is associated with the holding side and/or with the head side.

The guide axis and the outlet axis are positioned at an angle to each other. In some variations, the angle is greater than 0°, for example the angle is in a range between approximately 20° and approximately 170°. In at least one variation, the angle is approximately 90°.

When the term "approximately" is used when referring to values or value ranges, then this is intended to mean a tolerance range which the person skilled in the art will deem as common and usual, in particular a tolerance range of ±20%, for example ±10%, or ±5% is meant.

In some variations, the at least one outlet side is not identical to the holding side, and in at least one variation the at least one outlet side is not identical to the head side. In one form, the outlet side is identical to the head side, wherein additional outlet sides can be provided. The outlet side is characterized in particular by at least one outlet opening, which is preferably part of the at least one outlet recess. The at least one outlet recess extends preferably along the outlet axis, but in one form can have a curved profile, at least in sections. In some variations, the outlet axis and/or the guide axis are each straight. In at least one variation, the outlet axis is aligned at an angle to the guide axis; and in the case of identity of the outlet side with the head side, both axes also coincide. The outlet axis can be defined by an outlet section of the outlet recess, which is associated with the outlet side, or with the outlet opening, respectively. In some variations, the outlet section extends in a straight line. In at least one variation, the outlet section includes a thread, for example an interior thread. In an additional configuration the outlet section extends up to the guide recess.

An outlet nipple can be disposed in the at least one outlet recess. For example, the outlet nipple is a nipple for a cable screw connection, for example, the outlet nipple made by PFLITSCH GmbH & Co. KG, Hückeswagen, marketed under the brand name of blueglobe CLEAN-Plus®, for example, as offered in their PFLITSCH-Kabelverschraubungen [Cable Screw Connections] catalog, 04.16 on page 380. In one form the outlet nipple comprises at least one external thread. Furthermore, in one form the present disclosure provides that the outlet nipple includes a feedthrough opening for passage of at least one long line component. In some variations, the outlet nipple includes an outlet gasket, which can be arranged in its feedthrough opening. In particular, using the outlet gasket, a sealing of at least one long line component is performed, in particular a seal against the outer surface of the long line component. In some variations, the outlet nipple comprises a thread diameter which can be inserted into the outlet recess of the guide body.

The insert according to the present disclosure comprises at least the guide section. In some variations, the guide section is designed as being essentially tubular or sleeve-shaped. In an additional form the guide section is designed as cage-like or lattice-like and comprises in particular a number of rods. For example, in some variations the guide section comprises approximately two, approximately three or approximately four rods. In an additional form the guide section encompasses more than approximately 4 rods. In particular, the rods extend in the direction of the longitudinal axis of the guide section. In one additional form the rods are joined together by at least one ring or one ring section. In some variations, the ring or ring section is associated with the holding side of the guide body. Advantageously, the guide section comprises at least two rings or ring sections. Preferably, one of the two rings or ring sections is associated with the holding side of the guide body, and the other of the two rings or ring sections is associated with the head side of the guide body. In an additional form the guide section comprises a spiral spring. Furthermore, in one form the present disclosure provides that the guide section is designed at least partly as a spiral spring-shape. This form can be used for an advantageous pre-tensioning during the assembly of the guide section to the guide body and/or to the elbow screw joint system with a connection geometry, which is explained below.

The guide section is designed to accommodate or to guide through one or a plurality of long line components. In particular, the guide section is designed in order to feed through one or a plurality of cables, hoses or such. Advantageously, the guide section is designed for one or a plurality of in particular 1 up to approximately 5 long line components.

The guide section extends along a longitudinal axis which in some variations is straight. In at least one variation, this section is oriented identically to the guide axis of the guide recess of the guide body. In addition, in one form the present disclosure provides that the guide section includes an outer surface which comprises at least one recess. In one form the present disclosure provides that the recess extends along the longitudinal axis across the complete length of the guide section. The recess is designed in particular such that at least one long line component can be inserted through it. It is additionally desired that using the recess, the at least one long line component can be guided out from the guide section, and for example, can be guided into the outlet recess. The advantage of this form is that the at least one long line component can be easily mounted and redirected, and for example, can be guided away at an angle, in that it is guided through the guide section and then can be redirected or angled off into the recess. In an alternative form the present disclosure provides that the recess does not extend across the full length of the guide section along the longitudinal axis, especially when no ring sections are provided, as described above, but rather when rings are used. Fundamentally it is possible that the recess is designed as sufficiently large for the passage of at least one long line component. In one additional form the present disclosure provides that the guide section includes a plurality of recesses, preferably approximately 2, approximately 3, approximately 4 or more than approximately 4 recesses. Preferably, the plurality of recesses allows a plurality of long line components to be guided out at different heights, in different directions and/or at different angles to the longitudinal axis from the guide section and/or from the guide body, which can also be achieved under certain circumstances with a single recess. In an additional form the present disclosure provides that a plurality of guide sections are arranged rotatable in series in the direction of the longitudinal axis. Preferably, the recesses in the plurality of guide sections allow a plurality of long line components to be guided out at different heights, in different directions and/or at different angles to the longitudinal axis from the guide section and/or from the guide body, in particular when a plurality of outlet openings are provided in the guide body.

The guide section is installed so as to rotate in the guide body, and more preferably is designed so as to be moved along with the guide body upon rotation. Also, preferably the guide section has at least one positioning geometry. In one form the present disclosure provides that the guide section has at least one positioning geometry which is designed in particular due to at least one edge of the at least one recess, such that due to the positioning geometry the at least one recess of the guide section can be brought to coincide with the outlet recess. In another form, the [sic] comprises a ribbing in the guide section. Advantageously, the at least one positioning geometry of the guide section cooperates with the at least one positioner of the guide body. In one form the present disclosure provides that the guide section has at least two positioning geometries, preferably two edges or ribbings, which more preferably cooperate with at least two positioners of the guide body. In an additional form the at least one positioning geometry cooperates with the at least one long line component, which is preferably guided through the guide section or the guide recess, respectively, and the outlet recess. In an additional form the positioning geometry cooperates with at least one outlet nipple which is installed in the outlet recess, wherein in an additional form, the thread of the outlet nipple extends into the guide recess and can cooperate with at least two positioning geometries, preferably two edges of the at least one recess of the guide section. In an additional form the present disclosure provides that the at least one positioning geometry is arranged radially outward or to extend radially outward from the guide section. In particular, the outward extending positioning geometry can cooperate with a positioner of the guide body designed as a groove. In an additional form, the present disclosure provides that the at least one positioning geometry is associated with the head side and/or with the holding side of the guide body. Due to the at least one positioning geometry, during alignment of the guide body, the guide section is caused to rotate about the guide axis.

In one form the guide section includes a lower and an upper end region. Advantageously, the lower end region can be associated with the holding side of the guide body and the upper end region can be associated with the head side of the guide body. The lower end region of the guide section includes in particular an axial locker. Preferably, the axial lock is a part of a radial bearing. The axial lock inhibits or essentially prevents an axial movement in at least one axial direction of the guide section. More preferably the axial lock cooperates with the connecting geometry. In an additional form the present disclosure provides that a lower, end region of the guide section which is associated with the holding side of the guide body includes an axial lock which forms a radial bearing with at least one retainer of the joiner or with at least one joining geometry. The axial lock can be designed as an at least partly encircling bead or at least partly encircling protrusion. In an additional form the axial lock includes a plurality of bead sections and/or protrusions, in particular approximately 2, approximately 3, approximately 4 or more than approximately 4 bead sections and/or protrusions. In an additional form the axial lock is designed as a perimeter groove or a plurality of groove sections, in particular approximately 2, approximately 3, approximately 4 or more than approximately 4 groove sections. In an additional form, the axial lock is designed as a circlip which is disposed preferably in a groove of the guide section. In an additional form the present disclosure provides that the axial lock includes a thread, in particular an outer thread and/or an inner thread.

In an additional form the guide section of the insert has a tapering with smaller outside diameter, which in particular allows adjusting of a free clearance to the tapering of the guide body, and/or to the second section of the guide body. An additional advantage is the upper end region of the guide section relative to the lower end region of the guide section which in one form is tapered and comprises in particular a smaller outer diameter. According to the teachings of the present disclosure, the upper end region comprises a thread. In one form the upper end region of the guide section comprises an outer thread and/or an inner thread. The upper end region of the guide section can protrude beyond the head side of the guide body, especially when an outer thread is provided at the upper end region of the guide section.

The joining geometry is a component through which especially at least one long line component can be guided, and is, for example, a wall, a housing or a cable guide. For this purpose, the elbow screw joint system is secured to the joining geometry. Advantageously, the joining geometry includes a feedthrough recess through which the at least one long line component can be guided. Also, preferably the elbow joint can be secured to the joining geometry such that the guide axis of the guide body and the longitudinal axis of the guide section engage through the transit recess. In one form the transit recess includes a thread. In an additional form the transit recess does not have the thread and is designed in particular as a drilled hole. In one additional form the joining geometry allocated to the transit recess includes at least one retainer. The retainer can include an embossing which extends, for example, out from a wall of the joining geometry. For example, at least the axial lock of the guide section of the insert ion part, and at least a part of the joining geometry, especially an inner wall of the transit recess, form a radial bearing.

In one form, the guide section engages through the transit recess of the joining geometry. Preferably, the axial lock herein is designed as an at least partly circumferential protrusion which engages behind the joining geometry. In this manner the drilled hole in connection with the guide section forms a radial plain bearing. The axial movement of the guide section and/or of the insert is limited in one direction due to the protrusion. A limiting of the axial movement of the guide section in the opposite direction is limited by means of the guide body mounted with the insert ion part.

Furthermore, in one form the present disclosure provides that the insert comprises a joiner which is disposed in the region of the holding side of the guide body. In one form the guide section is designed as freely rotating with the joiner. The joiner is advantageously a means for attaching the elbow screw joint system to a joining geometry. In particular, the joiner includes a transit opening which is provided preferably for passage of the at least one long line component. In one form, the joiner is an attachment nipple. More preferably, the joiner includes an upper section associated with the guide section, and a lower section associated with the joining geometry. The upper section of the joiner comprises in particular the at least one retainer. In one form the retainer of the joiner is designed such that it has a diameter, at least in sections, that is larger than the diameter of the guide recess, and thus preferably limits a penetration of the joiner of the insert into the guide body.

In one form the radial bearing is formed by the at least one retainer of the joining geometry and/or of the joiner with the axial lock of the guide section. The retainer of the joining geometry and/or of the joiner can be designed as an at least partly circumferential bead or at least partly circumferential protrusion. In an additional form the axial retainer includes a plurality of bead sections and/or protrusions, in particular approximately 2, approximately 3, approximately 4 or more than approximately 4 bead sections and/or protrusions. In an additional form the axial retainer is designed as a circumferential groove or a plurality of groove sections, in particular approximately 2, approximately 3, approximately 4 or more than approximately 4 groove sections. In an additional form, the axial retainer is designed as a circlip which is preferably disposed in a groove of the joiner and/or of the joining geometry. In an additional form the present disclosure provides that the retainer includes a thread, in particular an outer thread and/or an inner thread. The axial lock of the guide section can be detachably or non-detachably connected to the retainer of the retaining geometry or of the joiner. In particular, the axial lock and the retainer form a radial bearing which allows a preferably free rotation of the guide section with respect to the joiner. In addition, the radial bearing essentially limits an axial movement of the guide section to the joining geometry or to the joiner, wherein preferably an axial movement of approximately 0.1 mm to about 5 mm is tolerated. In general, the radial bearing comprises at least portions of the insert ion part, of the guide body and/or of the joining geometry, which essentially restrict an axial movement of the guide section and essentially permit a rotational movement of the guide section.

In an additional form the present disclosure provides that the axial lock and/or the retainer of the joining geometry and/or of the joiner includes at least one snap-in means, in particular for a defined, snap-in alignment for a rotation about the longitudinal axis of the guide section. Preferably, the retainer of the joiner and/or of the joining geometry includes at least one additional snap-in means which cooperates with the snap-in means of the axial lock. For example, the snap-in means can be designed as elevations or mutually engaging elements that provide a tactile response, in particular by overcoming of a greater torque for a rotation of the guide section.

In one form the present disclosure provides that the joiner includes key-abutment surfaces at the upper section. The key-abutment surfaces can be used in particular for screwing in the joiner, especially if it is designed as an attachment nipple, for example, in a joining geometry. In particular, the key-abutment surfaces have a key width like that of a hex-head screw. The lower section of the joiner preferably includes a thread, more preferably an outer thread. Advantageously, the screw head geometry allows the insert to be screwed into the joining geometry.

In one form the present disclosure provides that the joiner comprises at least one outer thread, preferably precisely one outer thread. In particular, with an form of the joiner as attachment nipple, an outer thread is provided especially at the lower section of the joiner.

In an additional form the present disclosure provides that the joiner includes a flange which can be connected to the joining geometry. In one additional form the joiner is designed for an adhesive and/or weld joint. In particular, the joiner comprises a contact surface which can be adhered to or welded to the joining geometry.

In an alternative form the joiner is a part of the guide body and is preferably connected directly thereto. Preferably, in this form the guide section can rotate about the joiner and is preferably associable with it.

In particular, an inner wall of the guide recess is designed such that the insert can easily rotate therein. More preferably, the guide recess includes at least one first diameter which allows an adjustment of free play with the insert ion part. In one additional form the guide recess has a second diameter which limits a movement of the insert in the direction of the guide axis. In particular, the tapering of the guide recess is adapted to the tapering of the guide section such that the guide section can be inserted at least partly into the guide body. More preferably, the second diameter allows the adjustment of free clearance with the insert ion part, especially with the upper end region of the guide section. In one form the first section of the guide recess comprises a length in the direction of the guide axis which corresponds essentially to the length of the guide section of the insert ion part. In an additional form the guide section is longer or shorter than the guide recess.

The cover preferably includes a cover thread. The cover thread is designed according to the configuration of the thread of the insert or of the guide section. For example, the insert on the guide section comprises an inner thread and the cover thread comprises an outer thread which can be screwed into the insert ion part. In an additional form the present disclosure provides that the insert includes an outer thread on the guide section. If the guide section in the assembled state extends beyond the head side of the guide body, then the cover is designed as a cap-shape, wherein an inner thread is disposed in the cover. In an additional form the guide recess is designed such that a cap-shaped part of the cover can be inserted at least partly therein and can be screwed onto the outer thread of the guide section. In one form the cover can be screwed on such that the insert is clamped at least partly to the guide body and/or to the joining geometry. More preferably the insert is clamped at least in part such that at least the guide section is locked. More preferably the cover can be screwed to the guide section such that the guide body is clamped to the joining geometry. In one form in which the insert ion part, preferably the retainer, has a greater diameter at least in sections, than the guide recess of the guide body, and thus engages behind the guide body, the guide body can be clamped to the joiner of the insert ion part. Also, preferably the guide body is clamped to the joining geometry such that the guide body is locked, in particular it is locked and cannot rotate. Preferably, the cover is screwed with a torque of approximately 8 Nm to approximately 15 Nm. Preferably, the term "locked and cannot rotate" is understood to mean that the guide body cannot be rotated by hand, preferably can rotate only with a torque of greater than approximately 13 Nm, more preferably greater than approximately 17 Nm.

In one form the cover is a dummy plug, that is, it is configured in particular such that it seals the head-side of the guide recess. In particular, the dummy plug means a cover with an outer thread. In an additional form the cover is designed as an outlet nipple, preferably like the outlet nipple described above.

The guide body, insert ion part, cover and/or outlet nipple include a sealing surface. Preferably, the guide recess and/or the outlet recess is surrounded by a sealing surface on the holding side, the head side and/or the outlet side. Also, preferably the sealing surface comprises a part of a flat surface section of the holding side, the head side and/or the outlet side. Also, preferably a cover threaded lug or an outer threaded lug of the outlet nipple is surrounded by a sealing surface. The sealing surface preferably provides at least in part a contact possibility for a gasket, in particular for a sealing ring. Preferably, the sealing surface comprises a metallic or electrically conducting surface. In an additional form a gasket surrounding the sealing surface is allocated to a sealing surface. In one configuration the present disclosure provides that the gasket is arranged in a setback or a groove disposed around the sealing surface. In particular, the gasket is seated on a recess of the setback or on a groove base. The groove to accommodate the gasket is preferably a perimeter, preferably angled depression in the material of the guide body, in particular of the holding side, the head side and/or of the outlet side, more preferably only of the holding side, the cover and/or of the outlet nipple. The setback is arranged preferably directly on one edge of the guide body, in particular of the holding side, the head side and/or of the outlet side, of the cover and/or of the outlet nipple. Also, preferably the setback is on the perimeter. More preferably the setback is an angular depression in the material of the guide body, in particular of the holding side, the head side and/or of the outlet side, of the cover and/or of the outlet nipple. Also, preferably the gasket extends beyond the sealing surface, especially by a defined amount. When clamping or pressing the guide body with the joining geometry, the cover, the insert or with the outlet nipple, the gasket by definition is generally compressed until the sealing surface rests upon a surface of the joining geometry and/or of the guide body. Thus, the sealing surface and gasket jointly act as the surface. Preferably, a defined compression of the gasket occurs. The setback in which the gasket is installed comprises a back-cut into which the gasket engages, in particular to secure the gasket. The mentioned designs of the gaskets are intended preferably for all gaskets of the elbow screw joint system, especially for the sealing of the cover and of the holding side, and of the outlet nipple. Due to the favorable forms described above, an electrically conducting and/or heat-conducting connection between guide body, insert ion part, cover, outlet nipple and/or joining geometry is created. In some variations, the elbow screw joint system is dust-tight and water-tight according to fuse type IP 68, for example approximately 10 bar to approximately 15 bar, or IP 69K. The elbow screw joint system offers protection in particular for high-pressure cleaning.

In particular, at least one gasket and/or one sealing ring comprises at least one material selected from a group consisting of thermoplastic elastomers, preferably silicone and/or thermoplastic polyurethane.

A first exemplary form of the elbow screw joint system comprises the guide body, the insert and the cover described above, wherein the guide body includes exactly one outlet recess. In this exemplary form the present disclosure provides that the insert includes the guide section described above. In this form in particular, the insert does not include any joiner which is connected to the guide section. In this form the guide section comprises the recess, which extends over the entire length of the guide section along the longitudinal axis. In this form the guide body comprises at least one positioner described above. In this form the cover is designed as a dummy plug.

A second exemplary form of the elbow screw joint system comprises the guide body, the insert and the cover described above, wherein the guide body includes exactly one outlet recess. In this exemplary form the present disclosure provides that the insert includes the guide section described above. In this form in particular, the insert does not include any joiner which is connected to the guide section. In this form the guide section comprises the recess, which extends over the entire length of the guide section along the longitudinal axis. In this form the guide body comprises at least one positioner described above. In this form the cover is designed as an outlet nipple.

A third exemplary form of the elbow screw joint system comprises the guide body, the insert and the cover described above, wherein the guide body includes exactly one outlet recess. In this exemplary form the present disclosure provides that the insert includes the guide section described above. In this form in particular, the insert does not include any joiner which is connected to the guide section. In this form the guide section comprises the recess, which extends over the entire length of the guide section along the longitudinal axis. In this form the guide body does not contain any positioners. In this form the cover is designed as an outlet nipple. A fourth exemplary form of the elbow screw joint system comprises the guide body, the insert and the cover described above, wherein the guide body includes exactly one outlet recess. In this exemplary form the present disclosure provides that the insert includes the guide section described above. In this form in particular, the insert does not include any joiner which is connected to the guide section. In this form the guide section comprises at least one, in another form a plurality, of recesses bounded at least on one side along the longitudinal axis. In this form the guide body does not contain any positioners. In this form the cover is designed as an outlet nipple.

A fifth exemplary form of the elbow screw joint system comprises the guide body, the insert and the cover described above, wherein the guide body includes exactly one outlet recess. In this exemplary form the insert comprises the guide section and the joiner, wherein the joiner can be designed as described above. In this form the guide section comprises at least one, in another form a plurality, of recesses bounded at least on one side along the longitudinal axis. In this form the guide body does not contain any positioners. In this form the cover is designed as an outlet nipple.

A sixth exemplary form of the elbow screw joint system comprises the guide body, the insert and the cover, wherein the guide body includes a plurality, in particular two, three or more than three, outlet recesses. In this exemplary form the present disclosure provides that the insert includes the guide section described above. In this form in particular, the insert does not include any joiner which is connected to the guide section. In this form the guide section comprises the recess, which extends over the entire length of the guide section along the longitudinal axis. In this form the guide body comprises at least one positioner described above. In this form the cover is designed as a dummy plug.

A seventh exemplary form of the elbow screw joint system comprises the guide body, the insert and the cover, wherein the guide body includes a plurality, in particular two, three or more than three, outlet recesses. In this exemplary form the present disclosure provides that the insert includes the guide section described above. In this form in particular, the insert does not include any joiner which is connected to the guide section. In this form the guide section comprises the recess, which extends over the entire length of the guide section along the longitudinal axis. In this form the guide body comprises at least one positioner described above. In this form the cover is designed as an outlet nipple.

An eighth exemplary form of the elbow screw joint system comprises the guide body, the insert and the cover, wherein the guide body includes a plurality of, in particular two, three, or more than three, outlet recesses. In this exemplary form the present disclosure provides that the insert includes the guide section described above. In this form in particular, the insert does not include any joiner which is connected to the guide section. In this form the guide section comprises the recess, which extends over the entire length of the guide section along the longitudinal axis. In this form the guide body does not contain any positioners. In this form the cover is designed as an outlet nipple.

A ninth exemplary form of the elbow screw joint system comprises the guide body, the insert and the cover, wherein the guide body includes a plurality of, in particular two, three, or more than three, outlet recesses. In this exemplary form the present disclosure provides that the insert includes the guide section described above. In this form in particular, the insert does not include any joiner which is connected to the guide section. In this form the guide section comprises at least one, in another form a plurality, of recesses bounded at least on one side along the longitudinal axis. In this form the guide body does not contain any positioners. In this form the cover is designed as an outlet nipple.

A tenth exemplary form of the elbow screw joint system comprises the guide body, the insert and the cover, wherein the guide body includes a plurality of, in particular two, three, or more than three, outlet recesses. In this exemplary form the insert comprises the guide section and the joiner, wherein the joiner can be designed as described above. In this form the guide section comprises the recess, which extends over the entire length of the guide section along the longitudinal axis. In this form the guide body comprises at least one positioner described above. In this form the cover is designed as a dummy plug.

An eleventh exemplary form of the elbow screw joint system comprises the guide body, the insert and the cover, wherein the guide body includes a plurality of, in particular two, three, or more than three, outlet recesses. In this exemplary form the insert comprises the guide section and the joiner, wherein the joiner can be designed as described above. In this form the guide section comprises the recess, which extends over the entire length of the guide section along the longitudinal axis. In this form the guide body comprises at least one positioner described above. In this form the cover is designed as an outlet nipple.

A twelfth exemplary form of the elbow screw joint system comprises the guide body, the insert and the cover, wherein the guide body includes a plurality of, in particular two, three or more than three, outlet recesses. In this exemplary form the insert comprises the guide section and the joiner, wherein the joiner can be designed as described above. In this form the guide section comprises the recess, which extends over the entire length of the guide section along the longitudinal axis. In this form the guide body does not contain any positioners. In this form the cover is designed as an outlet nipple.

A thirteenth exemplary form of the elbow screw joint system comprises the guide body, the insert and the cover, wherein the guide body includes a plurality of, in particular two, three, or more than three, outlet recesses. In this exemplary form the insert comprises the guide section and the joiner, wherein the joiner can be designed as described above. In this form the guide section comprises at least one, in another form a plurality of recesses bounded at least on one side along the longitudinal axis. In this form the guide body comprises at least one positioner described above. In this form the cover is designed as a dummy plug.

A fourteenth exemplary form of the elbow screw joint system comprises the guide body, the insert and the cover, wherein the guide body includes a plurality of, in particular two, three, or more than three, outlet recesses. In this exemplary form the insert comprises the guide section and the joiner, wherein the joiner can be designed as described above. In this form the guide section comprises at least one, in another form a plurality, of recesses bounded at least on one side along the longitudinal axis. In this form the guide body comprises at least one positioner described above. In this form the cover is designed as an outlet nipple.

A fifteenth exemplary form of the elbow screw joint system comprises the guide body, the insert and the cover, wherein the guide body includes a plurality of, in particular two, three, or more than three, outlet recesses. In this exemplary form the insert comprises the guide section and the joiner, wherein the joiner can be designed as described above. In this form the guide section comprises at least one, in another form a plurality of recesses bounded at least on one side along the longitudinal axis. In this form the guide body does not contain any positioners. In this form the cover is designed as a dummy plug.

A sixteenth exemplary form of the elbow screw joint system comprises the guide body, the insert and the cover, wherein the guide body includes a plurality of, in particular two, three, or more than three, outlet recesses. In this exemplary form the insert comprises the guide section and the joiner, wherein the joiner can be designed as described above. In this form the guide section comprises at least one, in another form a plurality, of recesses bounded at least on one side along the longitudinal axis. In this form the guide body does not contain any positioners. In this form the cover is designed as an outlet nipple.

A seventeenth exemplary form of the elbow screw joint system comprises the guide body, the insert and the cover. The guide body includes a holding side, from which a guide recess extends. The guide recess extends along a guide axis from the holding side out to a head side of the guide body. Furthermore, the guide body comprises an outlet side from which an outlet recess extends along an outlet axis out to the guide recess. The outlet recess comprises an inner thread, at least in one section, for example, to hold an outlet nipple.

In this exemplary form the insert comprises a joiner that is designed as an attachment nipple. Furthermore, the insert comprises a guide section that is rotatably connected to the joiner. In particular, the guide means comprises an axial lock, in this example an inner perimeter bead, which cooperates with a retainer of an upper section of the joiner. In particular, the axial lock engages behind the holding means. Retainer and axial lock form a radial bearing. Furthermore, the joiner comprises an outer thread on a lower section, which can be screwed into a thread of the joining geometry, for example. The upper section comprises key-rest surfaces for screwing the joiner into the joining geometry. On its lower end region, the guide section comprises the axial lock. An interior thread is provided in an upper, end region, which can be screwed to an outer thread of the cover. The guide section is preferably of a sleeve-like design and comprises an outer surface. A recess is provided across the entire length of the outer surface and a long line component can be guided through it. In addition, the recess is designed such that it includes a positioning geometry which is formed by the two edges of the recess. The positioning geometry cooperates with the positioners, which in this example is associated with the head side of the guide body. The positioners are designed preferably as clamping pins, which more preferably are installed into the guide body such that they partly extend into the guide recess. In particular, positioners and position geometry align the guide section such that the recess is partly coincident, at least in part, with the outlet recess. Furthermore, in an additional or in an alternative form the present disclosure can provide that an attachment contour of the outlet nipple is installed in the guide body such that it extends into the guide recess and cooperates with the positioning geometry and aligns the recess at least partly coincident with the outlet recess. Also in an alternative or supplemental form the present disclosure provides that the recess is aligned with the outlet recess due to the at least one long line component, which is guided through a transit opening of the joiner, through the guide section and the outlet recess. In particular, the guide body can be rotated about the guide axis, wherein the outlet recess remains aligned with the recess of the guide section. This is made possible in particular by the radial bearing which is formed by the retainer and axial lock, and allows the guide section to rotate about a longitudinal axis, whereas the joiner remains locked in the joining geometry. The guide axis of the guide recess is arranged at an angle greater than 0° to the outlet axis of the outlet recess, which here amounts preferably to approximately 90°.

With the assembling of the elbow screw joint system, at least one long line component is introduced through the insert and into a guide recess of the guide body and is guided out from an outlet recess. For example, before guiding of the long line component into or through at least the insert and the guide body, at least the guide section is introduced into the guide recess of the guide body. If the guide body is rotated about the longitudinal axis of the guide recess, the guide section is carried along, so that at least the recess of the guide section is aligned to at least one outlet recess of the guide body. The insert is inserted into the guide body and is screwed to the cover. The alignment of the guide body is locked by bolting and in particular tightening of the cover over one head side of the guide body with the threading of the guide section. Given a gentle bolting of the cover, preferably at an applied torque of less than about 8 Nm, the guide body on the joining geometry can be rotated about the guide axis, in particular by hand, so that the outlet direction is adjustable. After adjusting of the outlet direction, the cover is screwed tightly into the insert ion part, in particular with a torque of approximately 8 Nm up to approximately 15 Nm, so that the guide body is clamped to the joining geometry and a rotation of the guide body, in particular by hand, is no longer possible.

In all the forms described above, the present disclosure can provide that gaskets are provided that seal the elbow screw joint system. At least the holding side of the guide body, the cover and the joining nipple each include at least one gasket which is positioned preferably in a setback or in a groove. A sealing surface which is disposed on and resting radially against the gasket allows a preferably metallic, more preferably heat-conducting and/or electrically conducting connection to the joining geometry and/or to the guide body. The gasket extends preferably by a defined amount over the sealing surface. When clamping the guide body with the joining geometry, the gasket is generally compressed until the sealing surface rests upon a surface of the joining geometry and/or of the guide body. Thus, the sealing surface and gasket work together as a sealing surface and more preferably, a defined compression of the gasket can be supplied. The setback or the groove in which the gasket is installed, comprises a back-cut into which the gasket engages, in particular to secure the gasket. The named forms of the gaskets are intended preferably for all gaskets of the elbow screw joint system, especially for the sealing of the cover and of the holding side, and of the outlet nipple.

An EMC-damping can be provided in all forms. In particular, the elbow screw joint system includes an annular spring for EMC-damping, in particular with a 360°-shield contact. The term "electromagnetic compatibility" (EMC) means the ability of an apparatus, a system or device to operate satisfactorily in an electromagnetic environment, without itself causing electromagnetic disturbance which would be unacceptable for all apparatuses, systems or devices present in this environment. The EMC-damping makes it possible to reduce or minimize a field-related disruption on and/or in an electromagnetic field of a long line component, which is designed as a cable.

In addition, the present disclosure relates to a method for assembling of an elbow screw joint system as described above, wherein the elbow screw joint system comprises a guide body, an insert and a cover, wherein the insert comprises at least one rotatable guide section which can be disposed at least partly in an interior of the guide body, and wherein one long line component is inserted through the insert and is guided out from at least one outlet recess which is arranged at an angle to the guide recess in the guide body. Before or after guiding of the long line component into or through at least the insert, at least the guide section is introduced into a guide recess of the guide body. With a rotation of the guide body about a longitudinal axis of the guide recess, the guide section is carried along, so that at least one recess of the guide section is aligned to at least one outlet recess of the guide body. The alignment of the guide body is locked by bolting, and preferably also by tightening of the cover over one head side of the guide body with the threading of the guide section.

Preferably, by rotating of the guide body, an outlet direction can be adjusted for the at least one long line component. Passage of the long line component through the joining geometry is greatly simplified due to the proposed method. Firstly, the insert allows the preparation of the long line component for the angular alignment, in that in a first step it is guided preferably straight through the insert ion part, for example, preferably through the guide section. In the next step the long line component is guided through the guide body, wherein for example it is guided into the guide holder and then is guided out through the outlet recess. In an additional form the present disclosure provides that the outlet recess is aligned around the guide axis. In particular, an alignment is possible even after mounting of the long line component in the insert and guide body, more preferably even after mounting of the insert in the guide body. Then only after tightening of the cover is a locking implemented of the alignment of the guide body or of the outlet recess, respectively. Preferably, the cover is tightened at a torque of about 8 Nm up to about 15 Nm in order to obtain in particular a secure locking of the guide body.

Furthermore, in an alternative configuration the present disclosure provides that instead of the cover, an additional elbow screw joint system is screwed into the insert ion part. In this manner, a plurality of elbow screw joint systems can be combined in order to align a plurality of long line components in the same and/or in different directions, wherein preferably the elbow joints form a sealed system which can be adapted to each other by adjustment of the threads, in particular by adjusting of the thread lengths.

In addition, the use of an elbow screw joint system as described above is proposed for screwing and alignment of at least one long line component in an angled position. Preferably, the elbow screw joint system is used for bolting of cables. In particular, the elbow screw joint system is intended for use in the chemical, pharmaceutical and/or foodstuffs industry. In this regard the elbow screw joint system preferably features an EHEDG-certificate from the European Hygienic Engineering & Design Group corresponding to the applicable guideline dated January 2018. Furthermore, in one form the angular bolting is used in an EMC-sensitive environment. Also, preferably the elbow screw joint system comprises an EMC-shielding, which more preferably is separated from a seal, in particular from a gasket. Preferably, according to the present disclosure the elbow screw joint system is used for EMC-damping from approximately 80 dB to 90 dB at up to 100 MHz, more preferably for EMC-damping from approximately 50 dB up to approximately 80 dB at up to 2.5 GHz.

In an additional form the elbow screw joint system is used for bolting of long line components in explosive environments and in particular for guiding them through the joining geometry. Preferably, the elbow screw joint system satisfies the requirements of ATEX-Guideline 94/9/EG in the version dated January 2018.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 An exploded representation of an elbow screw joint system;

FIG. 2 A lower view of the elbow screw joint system according to view II-II from FIG. 3 without the outlet nipple;

FIG. 3 A cross sectional view of section III-III from FIG. 2;

FIG. 4 A detailed view IV from FIG. 3;

FIG. 5 A cross-section V-V from FIG. 2; and

Figure 6:
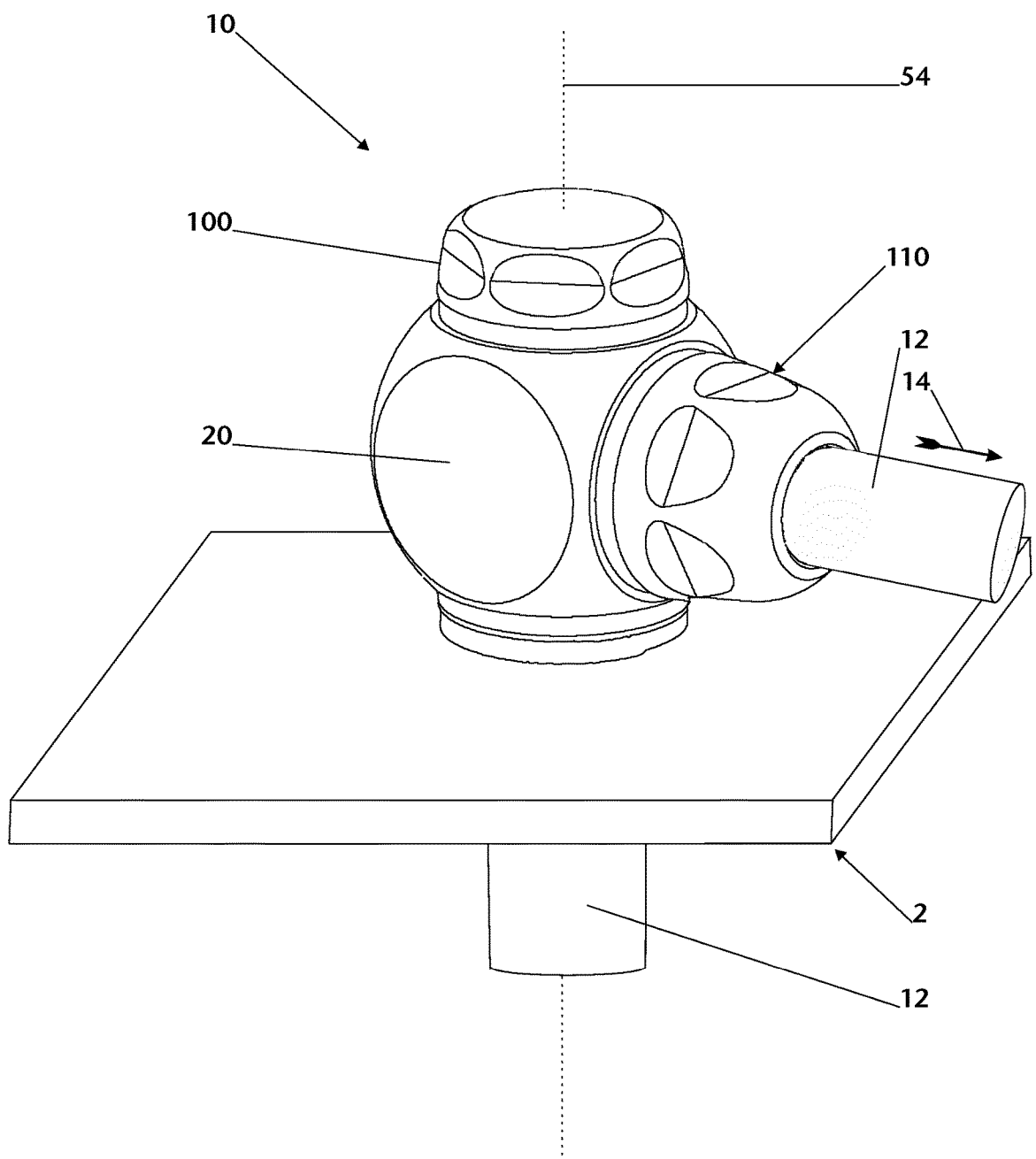

FIG. 6 A sketch of an assembled elbow screw joint system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 depicts an exploded representation of an elbow screw joint system 10. This system comprises a guide body 20, an insert 60 and a cover 100. The guide body 20 includes a holding side 24 with a holding opening 25 which extends into a guide recess 26. The guide recess 26 extends along a guide axis 54 from the holding side 24 out to a head side 44. A gasket 32 is allocated to the holding side 24 so that a sealing of the elbow screw joint system 10 occurs to a joining geometry 2 depicted in FIG. 6. Furthermore, the guide body 20 comprises an outlet side 34 from which an outlet recess 36 extends along an outlet axis 56 out to the guide recess 26. The outlet recess 36 comprises an inner thread 38, at least in one section, to hold an outlet nipple 110.

In the depicted form the insert 60 comprises a joiner 62 that is designed as an attachment nipple. Furthermore, the insert 60 comprises a guide section 80 that is rotatably connected to the joiner 62. In particular, the guide section 80 comprises an axial lock 90, for example in the shape of an inner perimeter bulge, which cooperates with a retainer 76 of an upper section 72 of the joiner 62. In some variations, the axial lock 90 engages behind the retainer 76. The retainer 76 and axial lock 90 form a radial bearing 61 as depicted in FIG. 3. Furthermore, the joiner 62 comprises an outer thread 64 on a lower section 68, which can be screwed into a thread of the joining geometry 2 (FIG. 6), for example. The upper section 72 comprises key-rest surfaces 74 for screwing the joiner 62 into the joining geometry 2. On its lower end region 88, the guide section 80 comprises the axial lock 90. An interior thread 86 is provided in an upper, end region 84, which can be screwed to a cover thread 102 of the cover 100. The guide section 80 is preferably of a sleeve-like design and comprises an outer surface 92. A recess 82 is provided across the entire length 94 of the outer surface 92 and a long line component 12 can be guided through it (see FIG. 6). In addition, the recess 82 is designed such that it has a positioning geometry 98 which is formed by the edges of the recess 82. The positioning geometry 98 cooperates with positioners 50, 52, which in this example is associated with the head side 44 of the guide body 20. In some variations, the positioners 50, 52 are designed as clamping pins which are inserted into the guide body 20 such that they extend partly into the guide recess 26, so that they can cooperate with the positioning geometry. In particular, positioners 50, 52 and positioning geometry 98 align the guide section 80 such that the recess 82 is partly coincident, at least in part, with the outlet recess 36. Further, in an additional or in an alternative form the present disclosure can provide that an attachment contour 111 of the outlet nipple 110 is installed in the guide body such that it extends into the guide recess 26 and cooperates with the positioning geometry 98 and thus aligns the recess 82 at least partly coincident with the outlet recess 36. Also in one form the present disclosure provides that the recess 82 is aligned with the outlet recess 36 due to the long line component 12, which is guided through a transit opening 66 of the joiner 62, through the guide section 80 and the outlet recess 36. In particular, the guide body 20 can be rotated about the guide axis 54, wherein the outlet recess 36 remains aligned with the recess 82 of the guide section 80. This is made possible in particular by the radial bearing 61 which is formed by the retainer 76 and axial lock 90, and allows the guide section 80 to rotate about a longitudinal axis 96, whereas the joiner 62 remains locked in the joining geometry 2.

FIG. 2 depicts a lower view of the elbow screw joint system 10 according to view II-II from FIG. 3 without the outlet nipple 110. It is evident that the insert 60 with the joiner 62 and the guide section 80 is inserted into the guide body 20.

FIG. 3 depicts a cross sectional view III-III from FIG. 2 with the cover 100 and the outlet nipple 110, which is added to the illustration to indicate the positioning separately from the elbow screw joint system 10. The insert 60 with the joiner 62 and the guide section 80 are inserted into the guide recess 26 of the guide body 20. The guide section 80 and joiner 62 are connected to each other via the radial bearing 61. The cover 100 is screwed into the guide section 80. The guide axis 54 of the guide recess 26 is arranged at an angle α to the outlet axis 56 of the outlet recess 36, which in this case is 90°.

In addition, from FIG. 3 it is evident that the upper end region 84 of the guide section 80 includes a tapering 85 which extends into a tapering 46 of the guide recess 26. These taperings 85, 46 fit one-into-the-other and limit the penetration depth of the guide section 80 into the guide recess 26 and inhibit or prevent an incorrect assembly of the insert 60 into the guide body 20.

FIG. 4, which depicts a detail IV from FIG. 3, illustrate gaskets which seal off the elbow screw joint system 10. Thus, from FIG. 3 it is evident that the holding side 24 of the guide body 20 includes the gasket 32 which is arranged in a setback 30. A sealing surface 28 of the guide body 20 allows a metallic connection, for example a heat-conducting and electrical-conducting connection to the joining geometry 2, which for conciseness is not depicted here. The gasket 32 extends preferably by a defined amount over the sealing surface 28. When clamping the guide body 20 with the joining geometry 2, the gasket 32 is compressed so much that the sealing surface 28 rests against a surface of the joining geometry. Thus, the sealing surface 28 and gasket work together as a surface and more preferably, a defined compression of the gasket 32 can be supplied.

FIG. 4 indicates that the cover 100 includes a setback 106 into which a gasket 108 is inserted. The gasket rests against a sealing surface 104 of the guide body and seals the cover 100. To secure the gasket 108 against the setback 106, this setback includes a back-cut 107 which cooperates with the gasket 108.

The designs of the gaskets depicted in FIG. 3 and FIG. 4 are intended preferably for all gaskets of the elbow screw joint system 10, for example for the sealing of the cover 100 and of the holding side 24, and of the outlet nipple 110.

FIG. 5 provides a detailed view V-V from FIG. 2, without the cover 100. FIG. 5 indicates that the guide recess 26 of the guide body 20 includes a lower section 68 and an upper section 72. The upper section 72 includes a tapering 46 which has an interior diameter D72 which is smaller than an interior diameter D68 of the lower section 68. In addition it is evident that the insert 60 with the guide section 80 is inserted into the guide recess 26 of the guide body 20, wherein the guide section 80 includes an upper end region 84 and a lower end region 88. The upper end region 84 has an outside diameter which fits—with adjustment of free clearance—into the interior diameter D72. The latter is not illustrated, for sake of simplicity. Furthermore, the lower end region 88 has an outside diameter which fits—with adjustment of free clearance—into the interior diameter D68 of the guide recess 26. The latter is also not illustrated, for sake of simplicity.

FIG. 6 depicts an exemplary assembly of the elbow screw joint system 10 and assembly of the elbow screw joint system 10 to a joining geometry 2, in which the insert 60 (not depicted here) is installed in the guide body 20 and is screwed to the cover 100. The long line component 12 is guided through the joining geometry 2, the elbow screw joint system 10 and the outlet nipple 110. Given a gentle bolting or screwing of the cover 100, in particular when an applied torque of less than approximately 8 Nm is used, the guide body 20 on the joining geometry 2 can be rotated about the guide axis 54, in particular by hand, so that the outlet direction 14 is adjustable. After adjusting of the outlet direction 14, the cover 100 is screwed tightly into the insert ion part, in particular with a torque of approximately 12 Nm up to approximately 15 Nm, so that the guide body 20 is clamped to the joining geometry 2 and a rotation of the guide body 20, in particular by hand, is no longer possible.

The refinements depicted in the figures are not to be interpreted as restrictive, rather the features described therein can be combined with each other and with the features described above to obtain additional configurations. For example, in one form the present disclosure can provide that the connecting means, in sections, has a greater diameter than the guide recess and thus limits a penetration of the insert into the guide recess.

With the proposed elbow screw joint system 10 a convenient possibility is created for screwing long line components 12 to a joining geometry 2, wherein an adjusting and/or a setting of the outlet direction 14 of the long line component 12 is possible even after assembly of the elbow screw joint system. By loosening of the cover 100, a subsequent adjusting of the outlet direction 14 is also possible.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An elbow screw joint system for screwing and redirecting of long line components, the elbow screw joint system comprising:
    a guide body, an insert, and a cover, wherein the insert includes at least one rotatable guide section disposed at least partly in an interior of the guide body, wherein:
        the guide body includes a guide recess and at least one outlet recess;
        the guide recess has a guide axis and extends along the guide axis from one holding side up to an opposing head side of the guide body;
        the outlet recess has an outlet axis and extends from at least one outlet side of the guide body along the outlet axis at least up to the guide recess;
        the guide axis and the outlet axis have an angle to each other;
        the guide section includes a threading on an upper end region associated with the head side of the guide body; and
        the cover is configured to be screwed from the head side to the threading of the guide section,
    wherein the guide section is rotatable within the guide recess before the guide section is secured by the cover or another component.

2. The elbow screw joint system according to claim 1, wherein the guide section includes an outer surface which comprises at least one recess.

3. The elbow screw joint system according to claim 2, wherein the guide section has at least one positioning geometry by which the recess can be brought to coincidence with the outlet recess.

4. The elbow screw joint system according to claim 2, wherein the guide section has a longitudinal axis and the at least one recess extends across an entire length of the guide section along the longitudinal axis.

5. The elbow screw joint system according claim 1, wherein the insert further comprises a joiner which is disposed in the region of the holding side of the guide body.

6. The elbow screw joint system according to claim 5, wherein a lower end region of the guide section associated with the holding side of the guide body includes an axial lock forming a radial bearing with at least one retainer of the joiner or with at least one joining geometry.

7. The elbow screw joint system according to claim 5, wherein the joiner includes key-abutment surfaces at an upper section.

8. The elbow screw joint system according to claim 5, wherein the joiner comprises an exterior threading.

9. The elbow screw joint system according to claim 1, wherein the another component includes at least one positioner arranged in the guide recess for aligning of the guide section.

10. A method for assembling of an elbow screw joint system comprising a guide body with a guide recess and an outlet recess arranged at an angle to the guide recess, an insert and a cover, wherein the insert comprises at least one rotatable guide section which can be disposed at least partly in an interior of the guide body, the method comprising:
    inserting at least one long line component through the insert such that the at least one long line component is guided into the guide recess of the guide body and emerges from the outlet recess which is arranged at the angle to the guide recess in the guide body,
    inserting the at least one rotatable guide section into the guide recess of the guide body,
    after the at least one rotatable guide section is inserted into the guide recess, rotating the guide body about a longitudinal axis of the guide recess until at least one recess of the guide section is aligned to the outlet recess of the guide body, and
    screwing of the cover over a head side of the guide body to a threading of the guide section and locking an alignment of the guide body.

11. The method according to claim 10, wherein the at least one long line component is guided into the guide recess of the guide body and emerges from the outlet recess which is arranged at the angle to the guide recess in the guide body before guiding of the long line component into the insert.

12. The method according to claim 10, wherein the at least one long line component is guided into the guide recess of the guide body and emerges from the outlet recess which is arranged at the angle to the guide recess in the guide body after guiding of the long line component into the insert.

13. The method according to claim 10, wherein the guide section includes an outer surface which comprises at least one recess.

14. The method according to claim 13, wherein the guide section has a longitudinal axis and the at least one recess extends across an entire length of the guide section along the longitudinal axis.

15. The method according to claim 10, wherein the insert further comprises a joiner which is disposed in the region of the holding side of the guide body.

16. The method according to claim 15, wherein a lower end region of the guide section associated with the holding side of the guide body includes an axial lock forming a radial bearing with at least one retainer of the joiner or with at least one joining geometry.

* * * * *